(12) United States Patent
Tomba et al.

(10) Patent No.: US 7,850,832 B2
(45) Date of Patent: Dec. 14, 2010

(54) POROUS NON-ASBESTOS SEPARATOR AND METHOD OF MAKING SAME

(75) Inventors: Nick J. Tomba, Painesville, OH (US); Michael S. Moats, W. Valley City, UT (US); Richard L. Romine, Concord, OH (US); Thomas F. Florkiewicz, Chagrin Falls, OH (US); Douglas J. Waskovich, Painesville, OH (US); Edward S. Kazimir, Mantua, OH (US)

(73) Assignee: Industrie de Nora S.p.A., Milan (IT)

( * ) Notice: Subject to any disclaimer, the term of this patent is extended or adjusted under 35 U.S.C. 154(b) by 484 days.

(21) Appl. No.: 12/066,134

(22) PCT Filed: Sep. 7, 2006

(86) PCT No.: PCT/US2006/034668

§ 371 (c)(1),
(2), (4) Date: Mar. 7, 2008

(87) PCT Pub. No.: WO2007/030509

PCT Pub. Date: Mar. 15, 2007

(65) Prior Publication Data

US 2008/0257722 A1 Oct. 23, 2008

(51) Int. Cl.
*C25B 13/08* (2006.01)
*C25B 13/04* (2006.01)
*C25B 13/00* (2006.01)

(52) U.S. Cl. .................. 204/296; 204/295; 204/283; 204/252; 427/243; 427/372.2; 427/376.2; 427/375; 427/384; 427/385.5; 162/157.2; 162/157.5

(58) Field of Classification Search .......... 204/296, 204/295, 283, 252; 427/243, 372.2, 376.2, 427/375, 384, 385.5; 162/157.2, 157.5
See application file for complete search history.

(56) References Cited

U.S. PATENT DOCUMENTS

| 4,853,101 A | | 8/1989 | Hruska et al. |
| 5,192,401 A | | 3/1993 | DuBois et al. |
| 5,683,749 A | | 11/1997 | DuBois et al. |
| 6,059,944 A | * | 5/2000 | DuBois et al. ............ 204/296 |
| 6,296,745 B1 | | 10/2001 | DuBois et al. |
| 6,299,939 B1 | * | 10/2001 | DuBois et al. ............ 427/243 |
| 2001/0030126 A1 | * | 10/2001 | Romine et al. ............ 204/242 |

FOREIGN PATENT DOCUMENTS

WO   WO86/01841 A   3/1986

OTHER PUBLICATIONS

International Search Report; PCT/US2006/-34668.

* cited by examiner

*Primary Examiner*—Bruce F Bell
(74) *Attorney, Agent, or Firm*—Eschweiler & Associates, LLC

(57) ABSTRACT

The present invention relates to an inert, non-asbestos separator and method of making same, the separator comprising an inorganic/polymer fibrid and agglomeration composite material containing from about 5 weight percent to about 70 weight percent of organic halocarbon polymer fibers together with from about 30 wt percent to about 95 weight percent of a finely divided non-organic particulate, which non-organic particulate is firmly bound in said composite fibrids and agglomerates; a natural gum thickening agent in an amount to provide a viscosity of about 6270 to about 590 cP at 0.22 $\sec^{-1}$; and an inert inorganic particulate powder whereby the inert inorganic particulate remains unbound from the inorganic/polymer fibrid and agglomeration composite, the inorganic particulate powder having a mean particle size of not greater than 1.0 μm and being present in an amount to provide a ratio of polymer fiber composite to unbound inorganic particulate in a range from about 1 to 25.

23 Claims, No Drawings

POROUS NON-ASBESTOS SEPARATOR AND METHOD OF MAKING SAME

FIELD OF THE INVENTION

The present invention relates to an inert asbestos-free diaphragm separator. The present invention further relates to a method for the deposition of the inert asbestos-free diaphragm separator.

BACKGROUND OF THE INVENTION

The electrolysis of alkali metal halide brines, such as sodium chloride and potassium chloride brines, in electrolysis cells is a well known commercial process. Electrolysis of such brines results in the production of halogen, hydrogen and aqueous metal hydroxide. In the case of sodium chloride brines, the halogen produced is chlorine and the alkali metal hydroxide is sodium hydroxide. The electrolytic cell typically comprises an anolyte compartment containing an anode, and a separate catholyte compartment containing a cathode assembly. The cathode assembly is typically comprised of a cathode and a liquid-permeable diaphragm, which partitions the electrolytic cell into the anolyte and catholyte compartments.

For the cell to operate properly, it is required that the diaphragm be sufficiently porous to allow the hydrodynamic flow of brine through it, while at the same time inhibiting the back migration of hydroxyl ions from the catholyte compartment into the anolyte compartment. The diaphragm should also (a) inhibit the mixing of evolved hydrogen and chlorine gases, and (b) possess low electrical resistance, i.e., have a low IR drop. Historically, asbestos has been the most common diaphragm material used in these chlor-alkali electrolytic diaphragm cells. Subsequently, asbestos in combination with various polymeric resins, particularly fluoro-carbon resins (the so-called polymer-modified asbestos diaphragms), have been used as diaphragm materials.

Owing to the health and environmental concerns associated with airborne asbestos fibers, the development of asbestos-free diaphragms for use in chlor-alkali electrolytic cells has been an area of ongoing exploration. Such diaphragms, which are often referred to as synthetic diaphragms, are typically fabricated from non-asbestos fibrous polymeric materials that are resistant to the corrosive environment of the operating chlor-alkali cell. These materials are typically perfluorinated polymeric materials, e.g., polytetrafluoroethylene (PTFE). The synthetic diaphragms may also contain various other modifiers and additives, including inorganic fillers, pore formers, wetting agents, ion-exchange resins and the like.

It is known that synthetic diaphragms for chlor-alkali cells can be prepared by coating and/or impregnating them with inorganic materials. However, such procedures generally require the addition of inorganic material or coating to a pre-formed diaphragm, thus requiring additional processing, equipment, and adding labor and cost.

It would be desirable, then, to develop a porous, non-asbestos separator and a method of forming the separator which provides the ability to control the separator's permeability, pore size, and tortuosity, thereby providing improved uniformity, operating efficiencies, and reduced energy consumption, in chlor-alkali cells without the necessity for additional equipment or processing steps.

SUMMARY OF THE INVENTION

In one embodiment, the invention relates to an inert, non-asbestos separator, the separator comprising an inorganic/polymer fibrid and agglomeration composite material containing from about 5 weight percent to about 70 weight percent of organic halocarbon polymer fibers together with from about 30 wt percent to about 95 weight percent of a finely divided non-organic particulate, which non-organic particulate is firmly bound in said composite fibrids and agglomerates; a natural gum thickening agent in an amount to provide a viscosity of about 6270 to about 590 cP at 0.22 $\sec^{-1}$; and an inert inorganic particulate powder whereby the inert inorganic particulate remains unbound from the inorganic/polymer fibrid and agglomeration composite, the inorganic particulate powder having a mean particle size of not greater than 1.0 μm and being present in an amount to provide a ratio of polymer fiber to unbound inorganic particulate in a range from about 1 to 25.

In another embodiment, the invention relates to a method for forming an inert non-asbestos separator on a foraminous structure for use in an electrolytic cell, the method comprising forming an aqueous slurry of an inorganic/polymer fibrid and agglomeration composite material containing from about 5 weight percent to about 70 weight percent of organic halocarbon polymer fibers together with from about 30 weight percent to about 95 weight percent of a finely divided non-organic particulate, which non-organic particulate is firmly bound in said composite fibrids and agglomerates with an inorganic particulate being in the slurry together with a natural gum thickening agent; adding to the slurry inert inorganic particulate powder whereby the inert inorganic particulate remains unbound from the inorganic/polymer fibrid and agglomeration composite, the inorganic particulate powder having a mean particle size of not greater than 1.0 micron and being present in an amount to provide a ratio of polymer fiber composite to unbound inorganic particulate in a range from about 1 to 25; depositing the particulate materials from the slurry onto a foraminous substrate by immersing the separator; drawing a vacuum on the separator at a controlled flow rate of from about 1.0 to about 7.5 L/min*m²; removing the separator from the slurry for a period of from about 1 minute up to about 90 minutes and re-immersing the separator in the slurry for a period of from about 1 minute up to about 10 minutes; drying the deposited separator at an elevated temperature; heating the separator to allow the organic composite fibrids, agglomerates, and unbound inorganic particulate to fuse together; and soaking the separator in a solution of a surface active agent so as to render the separator hydrophilic.

DETAILED DESCRIPTION OF THE INVENTION

The synthetic diaphragms of the invention for use in chlor-alkali electrolytic cells are prepared predominantly from organic fibrous polymers and inorganic particulate. Useful organic polymer precursors of the composite fibrids and agglomerates include any polymer, copolymer, graft polymer or combination thereof which is suitable for being chemically and mechanically resistant to the operating conditions in which the composite fibrid will be employed, e.g., chemically resistant to degradation by exposure to electrolytic chemicals such as sodium hydroxide, chlorine, hypochlorite, hypochlorous acid, and hydrochloric acid. By mechanically resistant for such example, the polymer should be selected so that the composite can maintain a high modulus, i.e., be resistant to inelastic deformation at above normal temperature, e.g., at temperatures up to 100° C. or more. In one embodiment, such polymers are the halogen-containing polymers which include fluorine, e.g., fluorine-containing or fluorine-and chlorine-containing polymers, such as polyvinyl fluoride, polyvinylidene fluoride, polytetrafluoroethylene (PTFE) polymer, polyperfluoroethylene, propylene, polytrifluoroethylene, polyfluoroalkoxyethylene (PFA polymer), polychlorotrifluoroethylene (PCTFE polymer), and the copolymer of chlorotrifluoroethylene and ethylene (CTFE polymer), with PTFE being preferred.

The polymer will be used in particulate form, and it is contemplated that it will include particles such as powders, aggregates and agglomerates including powder agglomerates which may be found in particle dispersions and particularly colloidal dispersions. Other useful particulate forms include granules, chunky-bodied particulates, fibers and mixtures of the foregoing. When fibers are utilized, it is preferred to use short, chunky fibers or a mixture including such fibers. As the term is used herein, "chunky fibers" typically have a length to diameter ratio not substantially in excess of 100:1, with many fibers being much less, e.g., having a ratio on the order of 10:1 to 20:1, thereby permitting greater ease for the fiber to "grow" in composite preparation. For convenience, all of these polymer particulates may simply be referred to herein as "precursor particles" for the composite fibrids and agglomerates. Typically, dispersions of pulverulent polymer are used, and for ease of composite fibrid and agglomeration production, these particles of the dispersion will have finely-divided character such that their size range is between about 0.05 μm to 200 μm in diameter. For example, commercially available particulate PTFE polymer dispersions can be obtained which have polymer particles having diameters ranging up to about 0.5 μm. Such dispersions are described in U.S. Pat. No. 4,047,537. These dispersions have submicron sized particles. The dispersions are hydrophilic, negatively charged colloid dispersions, containing particles having diameters preferably of about 0.05 μm to about 0.5 μm, suspended in water. However, when used in liquid media, it is acceptable that the polymer may also be partially solubilized or swollen as well as dispersed by such liquid or liquid blend. Another useful commercially available product is a fluoropolymer powder agglomerate. Powder agglomerates of commercial PTFE polymer powder can have average particle size for the agglomerates ranging typically between about 0.1 μm and 100 μm.

It is also contemplated that the polymer fibrid and agglomerate precursors may be mixtures of various polymer particles, e.g., granules, fibers, fibrils, and fibrids of different sizes, lengths, and compositions. The terms fibrid and fibril as used herein have substantially the same meaning to indicate that shearing action has been employed in their preparation. When mixtures are used, the majority by weight of such mixtures will preferably include the particles of granular form, i.e., granules, powders, or chunky-bodied form, including the aggregates and agglomerates. Hence, the fiber and fibrid particulates will usually be in minor amount in the mixture.

The polymer particles are mixed with a non-organic particulate to form composite inorganic/polymer fibrids and agglomerations such that the inorganic and polymer particles are bound together. This bound non-organic particulate is a substance or mixture of substances which is refractory, in that it will retain particulate integrity under the physical conditions of composite fibrid and agglomeration formation, while being inert to the polymer substrate such that it does not chemically react with the polymer. By being inert, the non-organic will be a substance capable of being physically bound to the polymer in processing without chemically reacting with such polymer. Depending generally on the use of the composite fibrid product, the non-organic may be pure or contain impurities, can be natural or synthetic, can be elemental or elements in combined form, may be hydrated or the like and change in processing, e.g., lose water of hydration, may be employed in one or more crystalline forms, and can be extremely hard, such as zirconia, or less so, such as talc. Suitable non-organic substances include oxides, carbides, borides, silicides, sulfides, nitrides, silicates, aluminates, ceramics, cermets, carbon or mixtures thereof. It is also contemplated to use particulate metals and alloys as well as mixtures, including, for example, mixtures of metal and metal oxides. In a preferred embodiment, the inorganic particulate employed will be zirconia owing to its inert properties, e.g., inert to chemical reaction in a pH range such as from 2 to 14 with the chemicals of a chlor-alkali cell. In general, naturally occurring materials such as zirconia are suitable with or without impurities, or they may be used as blends. The common particulate form of zirconia is a heavy, white, amorphous powder, but may also occur as crystals, fused aggregates or whiskers. All such particulates may be employed.

The non-organic particulate material to be mixed with the polymer particles to form the composite fibrid and agglomerate will generally have a finely-divided size or size distribution. The non-organic particulate may be small fragments, e.g., generally more finely divided than 100 mesh, in one embodiment of about 150 μm, and in another embodiment more finely divided than about 400 mesh (36 μm). Mesh as used herein is U.S. Sieve Series. In one embodiment, zirconia will be employed as the particulate material. The particulate material will generally be employed in powder form, and have an average particle size of from about 0.4 to about 16 μm, and in one embodiment, an average particle size of about 1 μm. In one embodiment, the bound non-organic particulate material will comprise from about 10% to about 99% by weight in the polymer fiber/non-organic composite.

Although simple dry mixtures can be successfully processed to prepare suitable fibrid composites, a liquid medium may also be employed. A liquid medium that can be useful in composite preparation is usually aqueous. This may be only water. Typically, the liquid medium is provided by a commercially available polymer dispersion, such as has been mentioned hereinabove. It is contemplated that the suitable liquid media will include a variety of organic vehicles, including alcohols, hydrocarbons, and halocarbon oils, as well as blends of liquids, e.g., water and alcohol. Thus, as an example, non-aqueous acrylic polymer dispersions can be serviceable, as well as aqueous dispersions.

In general, any amount of polymer employed will be sufficient so long as it links the inorganic particulates into an inorganic polymer composite fiber. This amount will vary with the identity of the polymer used and also with its physical form. The amount of polymer used can also vary with the type and size of the inorganic used as well as the desired service for the composite fiber product. Generally, the polymer will comprise from about 1.0 to about 90 percent, and more often from about 5.0 to about 70 percent, of the inorganic-polymer composite fiber total, with the foregoing percentages all being weight percent and all being on a dry basis. With the most preferred composite fiber, $ZrO_2$-PTFE polymer fiber, and considering an end use as a diaphragm in a chlor-alkali cell, the zirconia will advantageously be present in major weight amount, i.e., exceed 50 weight percent of the product, and in one embodiment, for best hydrophilic property the $ZrO_2$-PTFE polymer ratio ranges from about 2:1 to about 8:1 by weight.

To enhance formation of the non-organic polymer composite fibers, it is preferred to employ a fiber-inducing substrate in the mix with a mixture of polymer plus inorganic. Such a substrate can serve to enhance formation of polymer fiber, or maintain a polymer fiber in form, and thus contribute to desirable composite fiber production. Preferably, the fiber-inducing substrate is a solid, pulverulent, inert material, or a mixture of such materials, e.g., a material or mixture that by being inert will not react chemically with the polymer or the inorganic. Group I or Group II metal salts can be useful. Usually such pulverulent material is in granular form. Typical substrate materials are salt (NaCl), $CaZrO_3$, alumina, limestone, sugar, sand, graphite, and the like. After use, the substrate particles can be removed from the composite fibers by any mechanical means or combination thereof suitable for separating particulates from fiber, e.g., screening whereby the large substrate particles are screened from the fiber.

In one embodiment, the slurry will contain a viscosity modifier or thickening agent to hold the polymer fibers/inorganic composite in suspension. Such thickening agents can include various natural gums such as a xanthan gum derivative, welan gum, gum Arabic and Diutan gum. The thickening agent will generally be in powder form and added to water in an amount sufficient to achieve the desired viscosity profile. The viscosity profile will range from about 6270 to about 590 cP at $0.22 \sec^{-1}$, from about 760 to about 115 cP at $2.2 \sec^{-1}$, and from about 185 to about 40 cP at $11 \sec^{-1}$. The thickening agent will comprise, in one embodiment, from about 0.5 grams per liter (g/l) to about 4.0 g/l, and in one embodiment from about 1.0 g/l to about 2.0 g/l.

An important aspect of the present invention is the addition of unbound fine inert inorganic particulate in addition to bound non-organic particulates present in the inorganic/polymer fiber composite. While not intending to be bound by any theory, and based on the information at hand, it has been found that such additional unbound inorganic dramatically decreases separator permeability and pore size, while increasing tortuosity, thereby decreasing cell voltage and increasing production efficiency. The unbound inorganic particulates used herein can be one or more of oxides or silicates of titanium, aluminum, magnesium, potassium, and/or zirconium-containing particulates in powder form, including $TiO_2$, $Al_2O_5$, $ZrSiO_4$, $Mg(OH)_2$, $KTiO_3$, and $ZrO_2$ and mixtures thereof. The unbound inorganic particulates are generally sub-micron-sized particulates which have a mean particle size, in one embodiment, of not greater than 1.0 μm, and in a preferred embodiment of not greater than 0.6 μm. The amount of unbound inorganic particulate present in the inorganic/polymer fiber composite is, in one embodiment, from about 5 wt % to about 90 wt %, and in one embodiment from about 10 wt % to about 75 wt %. The polymer fibrid and agglomerate to unbound inorganic particulate ratio will range in one embodiment from about 1.0 to about 25.0.

The polymer/fiber composite may also include other materials, e.g., additives and agents, especially when the polymer is present as a commercially available dispersion, such as dispersing agents, anti-foaming agents, wetting agents, stabilizers, biocides, and the like. Useful stabilizers include dispersion stabilizers, ultraviolet light stabilizers and the like, as well as dyes or coloring agents. These are typically not deliberately added during mixture formation, but rather are included in the polymer in its commercial preparation.

The diaphragm separator of the invention is prepared by depositing the components thereof onto a cathode of an electrolytic cell from an aqueous slurry. Typically, the components of the diaphragm separator will be made up as a slurry in a liquid medium, such as water. The slurry used to deposit the diaphragm separator comprises in one embodiment from about 50 to about 250 g/l total depositable solids and has a pH of between about 9.0 to 11.5. In another embodiment, the slurries of the present invention will contain from 120 to 180 g/l of total depositable solids. The appropriate pH may be obtained by the addition of alkali metal hydroxide, e.g., sodium hydroxide, to the slurry.

The diaphragm separator may be deposited from the mixture of slurry components onto a substrate by methods such as flow deposition, pressure deposition, combinations of such techniques, or other techniques known to those skilled in the art. The substrate can include a screen, perforated plate, or a backing member such as a film or cathode. Typically, such cathodes are provided with a diaphragm separator by immersion in the mixture of slurry components followed by drawing a vacuum on the catholyte chamber to a desired flow rate of filtrate. In one embodiment, the flow rate will range from about 1.0 to about 7.5 L/min*$m^2$, and in one embodiment the flow rate will range from about 3.0 to about 3.5 L/min*$m^2$. In one embodiment, the diaphragm separator is directly deposited on the cathode. The deposition is achieved after a uniform mixture of slurry components has been obtained, and the cathode or cathodes to be coated proceed through an initial immersion in the slurry, optionally with agitation of the slurry, and a vacuum is applied through the cathode chamber to the desired filtrate flow rate. The vacuum employed will gradually be increased in order to maintain the filtrate flow rate target, and will increase from 0 millimeters of mercury up to about 650 to 750 mm of mercury. The depositing process is continued until a minimum vacuum of approximately 508 mm of mercury (20 inches) is maintained for a period of about 90 minutes.

In one embodiment, the deposition process will include dipping steps following the initial immersion in the mixture of slurry components. In order to further reduce the permeability of the diaphragm separator, during the initial depositing process, the diaphragm separator will be removed from the slurry for a period of time from about 1 minute to about 90 minutes. The diaphragm separator is then re-immersed in the slurry for a period of from about 1 minute to about 10 minutes. The immersion and removal of the diaphragm separator from the slurry, which is always accompanied by a vacuum, can be carried out in this manner up to about 10 times.

After removal of the vacuum source, the coated substrate, such as a cathode, is then dried. While air drying may be employed, the coated substrate will typically be dried at an elevated temperature, in one embodiment, of from about 50° C. up to about 130° C., and in another embodiment from about 70° C. up to about 100° C. Drying time can range in one embodiment from about 0.5 hour up to about 4 hours or more, but will usually not exceed 3 hours. The resulting separator will have a thickness in one embodiment of from about 2 to about 6 millimeters (mm), and in one embodiment from about 2.5 to about 4.5 mm is obtained. The weight density of the deposited diaphragm will have a weight per unit surface are, in one embodiment, of from about 2 to about 15 kilograms per square meter, and in one embodiment from about 4.2 to about 5.2 kilograms per square meter.

Following drying of the diaphragm separator, the separator is heated at a temperature and for a time dependent upon the polymer component employed in the fiber composite. Generally, the temperature and the time will be sufficient to cause the composite fibrids to soften for fusing adjoining fibrids, agglomerates, and unprocessed inorganic powder, but insufficient to lead to any significant decomposition of the polymeric material. Heating can be attained by inserting the separator or coated substrate into an oven. It is important that the entire separator be allowed to reach the requisite temperature in order to ensure maximum and complete polymer fusion. In one embodiment where the fiber composite will contain PTFE polymer, for example, a fusion temperature of from about 300° C. to about 390° C. is employed, and in another embodiment from about 325° C. to about 370° C. Heating time, in one embodiment, will be from about 0.5 hour to about 1.0 hours, and in another embodiment, from about 1.0 hours to about 1.5 hours. It is to be understood that heating will be accomplished by gradual increase of the temperature from an initial drying temperature to a subsequent temperature at which fusion of the polymer fibers will occur. Additionally, in one embodiment, the heating process can be conducted such that heating will occur at a particular temperature for a specified period of time, followed by heating to an increased temperature for a specified period of time. Following either heating procedure, the separator is allowed to cool to room temperature.

Prior to use, the diaphragm separator will be treated with a surfactant. The treatment can be carried out in accordance with the procedure set forth in U.S. Pat. No. 4,606,805, or in accordance with the procedure set forth in U.S. Pat. No. 4,252,878. In one embodiment, a fluorinated surface-active agent is utilized, such as is commercially available under the trademark ZONYL by E. I. Dupont de Nemours & Co. A suitable perfluorinated hydrocarbon is a nonionic fluorosurfactant having perfluorinated hydrocarbon chains in is structure and the general formula $F_2C(CF_2)_mCH_2O(CH_2CH_2O)_nH$, wherein m is from 5 to 9 and n is 11. This fluorosurfactant is available under the trademark ZONYL FSN. The fluorosurfactant is usually applied in liquid form at a concentration of from about 20 to about 50 percent solids in isopropanol or an isopropanol-water solution. Prior to use, the solution is preferably diluted with water, for instance to a concentration of about 4% V/V. The separator is then immersed in the surfactant solution and allowed to soak for a prolonged period of time of up to about 48 hours. In one embodiment, the separator can be immersed under vacuum and soaked for a lesser period of time, e.g., for about one hour. After soaking the separator is then dried at about 75° C. to about 80° C. for up to about eight hours. The separator or diaphragm coated cathode is then typically ready for assembly in an electrolytic cell.

The cathodes on which the present inert non-asbestos diaphragm separator are placed are generally cathodes on which a diaphragm can be directly deposited or on which a preformed diaphragm, usually in mat form, can be placed. In one embodiment, the cathodes will be foraminous in nature, e.g., mesh, perforated sheet, or expanded metal, usually being constructed of a wire screen, and define an interior catholyte chamber. Cathode materials of construction include those known in the art, such as nickel, steel, iron and/or alloys thereof.

The diaphragm separators of the invention exhibit decreased permeability at a factor of 2-3 times that of the prior art diaphragm separators, thus allowing increased power savings and product efficiency, as shown in the following examples. Permeability is determined by calculation of the Pf (Perm Factor) utilizing the following empirical formula:

Pf (Perm Factor)=(Anolyte Level (cm)+Catholyte Level (cm)*1.333)/(CD [kA/m$^2$]*Salt/Caustic)

Perm factors of prior art diaphragm separators are typically less than 17 and normally range from 14±6, while the Perm factors of the invention are generally greater than 17 and normally range from 20±10.

EXAMPLES

The invention is more particularly described in the examples that follow, which are intended to be illustrative only, since numerous modifications and variations therein will be apparent to those skilled in the art.

Example 1

In a 14 liter slurry of the invention solution 21.00 grams (g) of Diutan thickener, a CP Kelco product, was added to fourteen liters (l) of water while agitating with a high shear mixer, using a Premier Mill Corp. Dispersator, at a rotation speed of 2,000 to 3,000 rpm. This solution is referred to as the "high shear solution". Mixing was continued for approximately 30 minutes. The pH of the mixture was adjusted to between 10.9-11.3 using 1N NaOH while continuing mixing.

After mixing for 30 minutes, a 500-ml sample of the high shear mixture was measured out to record the viscosity profile. The viscosity was measured using a Brookfield viscometer (an RV model which is indicative of the spring type) with a number one spindle and mixing speeds of 1 RPM, 10 RPM and 50 RPM (which corresponds to shear rates of 0.22 sec$^{-1}$, 2.2 sec$^{-1}$ and 11 sec$^{-1}$, respectively). An additional 2 liters of the high shear mixture was removed and set aside. The remaining high shear solution of approximately 12 L was then mixed at low shear of 50 to 200 rpm.

2800 grams of a PMX fiber, commercially available from ELTECH Systems Corporation Gruppo DeNora was added together with the 12 L of the high shear solution in the 20 L polypropylene (PP) tank. This solution was then mixed at low shear (50 to 200 RPM) using a paddle type mixer.

In a separate 4 L beaker, 840 grams of zirconium oxide powder was weighed out and combined with the 2 L of high shear solution. This solution was mixed at high shear (2000 to 3000 RPM) for 15 minutes using the Premier Mill Corp. Dispersator. This mixture was then poured into the PMX fiber mixture and mixed at low shear (50 to 200 RPM) for one hour.

A laboratory depositing rig designed to deposit lab scale diaphragms was fitted with two nylon-screened perforated plate cathode structures measuring 7$f$×7"×0.15" was submerged into the slurry, and using a Fisher Scientific Maxima C Plus vacuum pump a low vacuum of about 75 to 100 mm Hg was applied to the structure in order to deposit the POLYRAMIX fibrids, agglomerations, and unbound $ZrO_2$ solids onto the cathode surface. The rate at which the mat (i.e. separator) was deposited was controlled by regulating the filtrate flow. Filtrate flow rate was regulated between 3.0 to 3.5 liter/minute/cathode area [m$^2$]) by adjusting the pump vacuum with a clamp.

After 11 minutes, the cathode/diaphragm assembly was removed from the slurry for 5 minutes. The cathode/diaphragm assembly was returned to the slurry allowing deposition to continue for two minutes. After the two minutes, the cathode/diaphragm assembly was removed for a second time from the slurry for a period of 20 minutes, and then returned to the slurry to continue deposition for 2 minutes. The cathode/diaphragm assembly was removed for another 20 minutes, and then returned to the slurry to complete deposition of the diaphragm. A final drying vacuum of 28.43 inches Hg was held for 1 hour.

After achieving the "final drying vacuum" the vacuum source was removed and the cathode and separator was placed in a fusion oven to initiate bonding of the PMX fibers/inorganic particulate. The temperature was increased to about 100° C. over a 35 minute period and held for a period of about 240 minutes. The temperature was then increased to 350° C. over a period of about 125 minutes and held for a period of 60 minutes. The oven was then turned off and the cathode/diaphragm allowed to cool to room temperature. The total diaphragm weight density after drying was 4.49 and 4.44 Kg/m$^2$ for samples B and C, respectively (as shown in Table 1 below).

The cathode/diaphragm was soaked in a 4% vol/vol Zonyl (pH adjusted to about 11) solution for 8 hours, followed by drying at about 80° C. for about 8 hours. The resulting diaphragms and cathodes were placed into laboratory diaphragm chlor-alkali cells and operated at a temperature of 90° C. and a current density (CD) of 1.5 amperes/sq. in (ASI) for a period of 3 months. The cells had a brine feed concentration of 300 grams per liter NaCl with a pH of approximately 10. Following operation, the Perm Factor (Pf) was calculated from the empirical formula correlating the electrolyte differential to the current density and NaCl/NaOH ratio in the cell. A higher Pf indicates a less permeable diaphragm. The results are summarized in Table 1. Sample A is considered a standard synthetic diaphragm as a comparison. Samples B-C are in accordance with the invention.

4200 grams of a PMX fiber, commercially available from ELTECH Systems Corporation Gruppo DeNora was added together with the 12 L of the high shear solution in the 20 L polypropylene (PP) tank. This solution was then mixed at low shear (50 to 200 RPM) using a paddle type mixer.

In a separate 4 L beaker, 210 grams of zirconium oxide powder was weighed out and combined with the 2 L of high shear solution. This solution was mixed at high shear (2000 to 3000 RPM) for 15 minutes using the Premier Mill Corp. Dispersator. This mixture was then poured into the PMX fiber mixture and mixed at low shear (50 to 200 RPM) for one hour.

A laboratory depositing rig designed to deposit lab scale diaphragms was fitted with two nylon-screened perforated plate cathode structures measuring 7"×7"×0.15" was submerged into the slurry, and using a Fisher Scientific Maxima C Plus vacuum pump a low vacuum of about 75 to 100 mm Hg was applied to the structure in order to deposit the POLYRAMIX fibrids, agglomerations, and unbound $ZrO_2$ solids onto the cathode surface. The rate at which the mat (i.e. separator) was deposited was controlled by regulating the filtrate flow. Filtrate flow rate was regulated between 3.0 to 3.5 liter/minute/cathode area [m$^2$]) by adjusting the pump vacuum with a clamp.

After 18 minutes, the cathode/diaphragm assembly was removed from the slurry for 5 minutes. The cathode/diaphragm assembly was returned to the slurry allowing deposition to continue for two minutes. After the two minutes, the

TABLE 1

| Sample | Weight (Kg/m2) | Raw Cell Volts | Corrected Volts @ 1 ASI | Anolyte Level (inches) | NaOH (gpl) | Pf | Caustic C.E. | Power Consumption[1] (DCkWhr) | Power Consumption[2] (DCkWhr) |
|---|---|---|---|---|---|---|---|---|---|
| A | 4.32 | 3.473 | 3.115 | 14.1 | 137 | 14 | 91.5 | 2587 | 2338 |
| B | 4.49 | 3.192 | 2.915 | 18.3 | 142 | 24 | 86.0 | 2545 | 2324 |
| C | 4.44 | 3.184 | 2.906 | 21.7 | 128 | 24 | 89.2 | 2447 | 2234 |
| Delta Avg. | | −285 mV | −201 mV | 4.2 | −2 | 10 | −1.9 | −91 | −59 |

[1]CD = 1.5 ASI,
[2]CD = 1.0 ASI

It is, therefore, evident from the results of Table 1, that samples prepared according to the invention provide a less permeable diaphragm, and a decrease in the amount of energy required to manufacture the electrolytic cell product.

Example 2

In a 14 liter slurry of the invention solution 28.00 grams (g) of Diutan thickener, a CP Kelco product, was added to fourteen liters (l) of water while agitating with a high shear mixer, using a Premier Mill Corp. Dispersator, at a rotation speed of 2,000 to 3,000 rpm. This solution is referred to as the "high shear solution". Mixing was continued for approximately 30 minutes. The pH of the mixture was adjusted to between 10.9-11.3 using 1N NaOH while continuing mixing.

After mixing for 30 minutes, a 500-ml sample of the high shear mixture was measured out to record the viscosity profile. The viscosity was measured using a Brookfield viscometer (an RV model which is indicative of the spring type) with a number one spindle and mixing speeds of 1 RPM, 10 RPM and 50 RPM (which corresponds to shear rates of 0.22 sec$^{-1}$, 2.2 sec$^{-1}$ and 11 sec$^{-1}$, respectively). An additional 2 liters of the high shear mixture was removed and set aside. The remaining high shear solution of approximately 12 L was then mixed at low shear of 50 to 200 rpm.

cathode/diaphragm assembly was removed for a second time from the slurry for a period of 5 minutes, and then returned to the slurry to continue deposition for 2 minutes. The cathode/diaphragm assembly was removed for 20 minutes, and then returned to the slurry to continue deposition for 2 minutes completing the deposition of the diaphragm. A final drying vacuum of 28.12 inches Hg was held for 1 hour.

After achieving the "final drying vacuum" the vacuum source was removed and the cathode and separator was placed in a fusion oven to initiate bonding of the PMX fibers/inorganic particulate. The temperature was increased to about 100° C. over a 35 minute period and held for a period of about 240 minutes. The temperature was then increased to 350° C. over a period of about 125 minutes and held for a period of 60 minutes. The oven was then turned off and the cathode/diaphragm allowed to cool to room temperature. The total diaphragm weight density after drying was 4.71 Kg/m$^2$ for sample D (as shown in Table 2 below).

The cathode/diaphragm was soaked in a 4% vol/vol Zonyl (pH adjusted to about 11) solution for 8 hours, followed by drying at abut 80° C. for about 8 hours. The resulting diaphragms and cathodes were placed into laboratory diaphragm chlor-alkali cells and operated at a temperature of 90° C. and a current density (CD) of 1.5 amperes/sq. in (ASI) for a period of 3 months. The cells had a brine feed concentration of 300 grams per liter NaCl with a pH of approximately 10. Following operation, the Perm Factor (Pf) was calculated from the empirical formula correlating the electrolyte differential to the current density and NaCl/NaOH ratio in the cell. A higher Pf indicates a less permeable diaphragm. The results are summarized in Table 1. Sample A is considered a standard synthetic diaphragm as a comparison. Sample D is in accordance with the invention.

TABLE 2

| Sample | Weight (Kg/m2) | Raw Cell Volts | Corrected Volts @ 1 ASI | Anolyte Level (inches) | NaOH (gpl) | Pf | Caustic C.E. | Power Consumption[1] (DCkWhr) | Power Consumption[2] (DCkWhr) |
|---|---|---|---|---|---|---|---|---|---|
| A | 4.32 | 3.473 | 3.115 | 14.1 | 137 | 14 | 91.5 | 2587 | 2338 |
| D | 4.71 | 3.160 | 2.888 | 23.0 | 126 | 24 | 93.2 | 2325 | 2125 |
| Delta | | −313 mV | −227 mV | 8.9 | −9 | 10 | 1.7 | −262 | −213 |

[1] CD = 1.5 ASI,
[2] CD = 1.0 ASI

It is, therefore, evident from the results of Table 2, that sample prepared according to the invention provided a less permeable diaphragm, a decrease in the amount of energy required to manufacture the electrolytic cell product and an increase in the production efficiency.

What is claimed is:

1. An inert, non-asbestos separator, the separator comprising:
    a) an inorganic/polymer fibrid and agglomeration composite material containing from about 5 weight percent to about 70 weight percent of organic halocarbon polymer fibers together with from about 30 wt percent to about 95 weight percent of a finely divided non-organic particulate, which non-organic particulate is firmly bound in said composite fibrids and agglomerates;
    b) a natural gum thickening agent in an amount to provide a viscosity of about 6270 to about 590 cP at 0.22 sec$^{-1}$; and
    c) an inert inorganic particulate powder whereby the inert inorganic particulate remains unbound from the inorganic/polymer fibrid and agglomeration composite, the inorganic particulate powder having a mean particle size of not greater than 1.0 µm and being present in an amount to provide a ratio of polymer fiber composite to unbound inorganic particulate in a range from about 1 to 25.

2. The separator of claim 1, wherein the polymer fibers are in particulate form comprising powders, granules, polymer aggregates and agglomerates, chunky-bodied particulates, chunky fibers and mixtures thereof.

3. The separator of claim 1, wherein the composite fibrids have diameters within the range of from about 0.05 µm to about 200 µm.

4. The separator of claim 1, wherein the non-organic particulates have a size distribution more finely divided than about 150 µm.

5. The separator of claim 1, wherein the non-organic particulate comprises at least one particulate chosen from oxides, borides, carbides, silicides, sulfides, nitrides, silicates, aluminates, ceramics, cermets, carbon, metal oxides, alloys, and mixtures thereof.

6. The separator of claim 1, wherein there is in admixture with the composite fibers a fiber-inducing substrate comprising a solid, pulverulent, inert material.

7. The separator of claim 1, wherein the natural gum thickening agent comprises one or more of xanthan gum derivative, welan gum, gum Arabic and Diutan gum.

8. The separator claim 7, wherein the natural gum thickening agent is present in an amount from about 0.5 g/l up to about 4.0 g/l.

9. The separator of claim 1, wherein the inert inorganic particulate powder comprises one or more of oxides or silicates of titanium, aluminum, magnesium, potassium, and zirconium.

10. The separator of claim 9, wherein the inert inorganic particulate powder comprises particulates having a mean particle size of not greater than 1.0 µm.

11. The separator of claim 1, wherein the amount of unbound inorganic particulate in the inorganic/polymer fiber composite comprises from about 5 wt. % to about 90 wt %.

12. The separator of claim 1, wherein the separator has a thickness of from about 2 mm to about 6 mm.

13. A method for forming an inert non-asbestos separator on a foraminous structure for use in an electrolytic cell, the method comprising:
    forming an aqueous slurry of an inorganic/polymer fibrid and agglomeration composite material containing from about 5 weight percent to about 70 weight percent of organic halocarbon polymer fibers together with from about 30 weight percent to about 95 weight percent of a finely divided non-organic particulate, which non-organic particulate is firmly bound in said composite fibrids and agglomerates with an inorganic particulate being in the slurry together with a natural gum thickening agent;
    adding to the slurry inert inorganic particulate powder whereby the inert inorganic particulate remains unbound from the inorganic/polymer fibrid and agglomeration composite, the inorganic particulate powder having a mean particle size of not greater than 1.0 micron and being present in an amount to provide a ratio of polymer fiber composite to unbound inorganic particulate in a range from about 1 to 25;
    depositing the particulate materials from the slurry onto a foraminous substrate by immersing the separator;
    drawing a vacuum on the separator at a controlled flow rate of from about 1.0 to about 7.5 L/min*m$^2$;
    removing the separator from the slurry for a period of from about 1 minute up to about 90 minutes and re-immersing the separator in the slurry for a period of from about 1 minute up to about 10 minutes;
    drying the deposited separator at an elevated temperature;
    heating the separator to allow the organic composite fibrids, agglomerates, and unbound inorganic particulate to fuse together;
    and soaking the separator in a solution of a surface active agent so as to render the separator hydrophilic.

14. The method of claim 13, wherein the slurry comprises from about 50 to about 250 g/l total depositable solids.

15. The method of claim 13, wherein the particles are deposited onto the foraminous substrate by one or more of flow deposition, pressure deposition or combinations thereof.

16. The method of claim 15, wherein the foraminous substrate comprises one or more of a screen, a perforated plate, or a backing member.

17. The method of claim 13, wherein the flow rate ranges from about 3.0 to about 3.5 L/min*m$^2$.

18. The method of claim 13, wherein the flow rate is maintained at a pressure of up to about 750 mm of mercury.

19. The method of claim 18, wherein depositing of the particles is continued until a minimum vacuum of 508 mm of mercury is maintained for a period of about 90 minutes.

20. The method of claim 13, wherein the separator is dried at a temperature of from about 50° C. to about 130° C. for a time of about 0.5 hour to about 4.0 hours.

21. The method of claim 13, wherein the separator is heated at a temperature of from about 300° C. to about 390° C. for a time of about 0.5 hour up to about 1.5 hours.

22. The method of claim 13, wherein the separator is soaked in a surface active agent comprising a fluorinated surface active agent for a time of up to 8 hours, followed by drying at a temperature of from about 75° C. to about 80° C. for a time of up to about 48 hours.

23. The method of claim 13, wherein the weight per unit surface area of the deposited diaphragm is from about 2 up to about 15 kilograms per square meter.

* * * * *